(12) United States Patent
Koski et al.

(10) Patent No.: US 7,598,706 B2
(45) Date of Patent: Oct. 6, 2009

(54) CELL BALANCING BATTERY PACK AND METHOD OF BALANCING THE CELLS OF A BATTERY

(75) Inventors: Roy Donald Koski, West Bend, WI (US); Paul Daniel Lindquist, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 11/627,562

(22) Filed: Jan. 26, 2007

(65) Prior Publication Data

US 2008/0180061 A1 Jul. 31, 2008

(51) Int. Cl.
*H02J 7/00* (2006.01)
*H02J 3/32* (2006.01)
*H02J 1/00* (2006.01)

(52) U.S. Cl. .................. 320/117; 320/116; 320/118; 320/122; 320/125; 320/128; 307/48; 307/71

(58) Field of Classification Search .............. 320/117, 320/116, 122, 128
See application file for complete search history.

(56) References Cited

U.S. PATENT DOCUMENTS

| | | | |
|---|---|---|---|
| 4,698,144 A | 10/1987 | Wainesdi | |
| 5,293,007 A | 3/1994 | Darst et al. | |
| 5,920,179 A | 7/1999 | Pedicini | |
| 6,114,835 A | 9/2000 | Price | |
| 6,278,604 B1 | 8/2001 | Patel et al. | |
| 6,624,612 B1 | 9/2003 | Lundquist | |
| 6,701,150 B1 | 3/2004 | Huang et al. | |
| 6,844,703 B2 | 1/2005 | Canter | |
| 6,873,134 B2 | 3/2005 | Canter et al. | |
| 7,081,737 B2 | 7/2006 | Liu et al. | |
| 7,126,312 B2 | 10/2006 | Moore | |
| 2005/0077875 A1 | 4/2005 | Bohley | |
| 2005/0221839 A1 | 10/2005 | Chan et al. | |
| 2005/0269988 A1 | 12/2005 | Thrap | |
| 2005/0269989 A1 | 12/2005 | Geren et al. | |
| 2006/0033475 A1 | 2/2006 | Moore | |
| 2006/0071643 A1 | 4/2006 | Carrier et al. | |
| 2006/0255769 A1 | 11/2006 | Liu et al. | |

OTHER PUBLICATIONS

Barsukov, Yevgen (2005) "Cell Balancing Using the bq20zxx" Texas Instruments.
Martinez, Carlos et al. (2005) "Using Cell Balancing to Maximize the Capacity of Multi-cell Li-Ion Battery Packs," Publication by Intersil.

*Primary Examiner*—Edward Tso
*Assistant Examiner*—Yalkew Fantu
(74) *Attorney, Agent, or Firm*—Andrus, Sceales, Starke & Sawall, LLP

(57) ABSTRACT

A battery with a battery balancing assembly that regulates the discharge of battery cell charge and a method of evenly discharging battery cells, the battery comprising a plurality of cells. The balancing assembly includes switches disposed between the cells such that the switches may configure the cells in a normal configuration and a balance configuration, wherein in the normal configuration the plurality of cells may be connected to an electronic device and wherein in the balance configuration the plurality of cells are connected to a balancing circuit. The balancing circuit serving to balance the charge in the plurality of cells prior to the recharging of the cell.

20 Claims, 5 Drawing Sheets

CELL BALANCING BATTERY PACK AND METHOD OF BALANCING THE CELLS OF A BATTERY

FIELD OF THE DISCLOSURE

The present disclosure relates to the field of rechargeable batteries and energy cells for rechargeable batteries. More specifically, the present disclosure relates to circuitry and a method for balancing the discharge of battery cells.

BACKGROUND OF THE DISCLOSURE

Batteries are a convenient source of electrical energy for many types of portable and/or mobile electronics. A typical battery is formed by the connection of a number of electrical cells connected in a series configuration. Many types of batteries include rechargeable cells, such that when an outside energy source is applied to the battery cells energy is stored within the cells. While many chemical combinations for the cathode and the anode of the battery cells exist, some commonly used combinations include nickel cadmium (NiCd), nickel metal hydride (NiMH), and lithium ion (Li-Ion) compositions.

While the rechargeable battery cells provide a convenient source of power, the rechargeable battery cells do not have an infinite life span and the ability of the cells to hold a charge degrades over the lifetime of the cell. Furthermore, battery cells leak energy and lose charge during periods of non-use or storage. These periods of non-use may occur while the cells are being held by a manufacturer before the cells are assembled into a battery, or while the cells are assembled into the battery, but the battery has not yet been sold, or during long periods of non-use of the battery by the consumer. The cell leakage is exacerbated by the presence of heat, which may affect batteries that are not stored in a temperature controlled environment. Alternatively, the cell leakage due to heat may affect a battery, such as a back up battery, that is held in close proximity to other normally operating electrical circuits that give off heat. Furthermore, due to the internal resistance of the battery, battery cells may not discharge evenly within the battery. All of these factors cause each battery cell to hold a different level of charge in comparison to the other cells in the battery. These different levels of charge can result in unpredictable indications of low battery and possible inadvertent power shut downs.

Battery monitors are used to monitor the remaining battery discharge time by monitoring both the total charge of all the battery cells and the charge on each individual cell. Typically, a predetermined minimum charge threshold is established for both the total battery charge and for the individual cell charge. If either measure falls below the respective predetermined minimum threshold, the battery terminates discharge, cutting the power to the electronic device. Typically, the individual cell predetermined threshold accounts for possible cell imbalance by allowing an individual cell to operate at a charge level lower than that cell's fractional share of the total battery charge predetermined threshold. For example, if a battery has three cells and the battery cell predetermined minimum charge is 9 volts, the individual cell predetermined minimum charge may be 2.4 volts instead of the 3 volts that would be one third of the 9 volt total. The battery may also produce an indication of the remaining battery charge and this indication is determined by using the total cell charge of all the battery cells. Therefore, if the cells are unbalanced, one cell may fall below the individual cell charge threshold before the total battery charge reaches the total battery charge minimum threshold. This results in the battery terminating the supply of a charge before the total battery charge has reached the minimum threshold value. This reduces the operable battery time between charges and produces an unpredictable termination of the battery discharge.

Similarly when the battery is charging, the cells are charged until the total charge on the cells reaches a threshold value. Additionally, charging is also terminated when the charge on any one individual cell reaches predetermined maximum charge threshold. Therefore, if the cells are unbalanced, one cell may reach the individual cell maximum charge threshold, while the total charge of the battery has not yet achieved full battery charge. This results in the battery not being charged to its full charge potential, which reduces the operable battery time between charges.

Methods and systems have been developed to attempt to remedy the problem of cell unbalance. The manual process of measuring the state of charge of each cell and matching the cells with similar charges when they are assembled into a battery is inaccurate and very time consuming. Furthermore, this manual process does not address any cell leakage that may occur after battery assembly. Alternatively, active cell balancing may be implemented using a series combination of a load resistor and a transistor placed in parallel with each individual cell, where the resistor and transistor shunt current during charge of the battery cells. This type of cell balancing is achieved by software using a complex control algorithm and merely emulates the cell charge balance rather than forcing an inherent cell charge balance and therefore is sensitive to many sources of error, such as initial cell charge and the cell open circuit voltage.

Therefore, it is desirable in the field of rechargeable batteries to provide a battery that is capable of balancing the charge of each of the cells to maximize the operable battery discharge time. It is also desirable for a battery that achieves cell charge balancing that is not as dependant on complex software algorithms to emulate the forcing of inherent cell balance. It is desirable for a battery that achieves cell balancing and uses measured values of cell characteristics in controlling the cell balancing. Furthermore, a method for balancing the charge on the cells of a battery is desirable. It is desirable for the method to be operable prior to assembly of the cells into a battery, or for the method to be operable after the battery has been constructed.

SUMMARY OF THE INVENTION

An embodiment of the battery in the present disclosure comprises a plurality of cells that produce a battery charge and the battery comprises a plurality of switches connected between the battery cells and a load, the switches being configurable such that the battery cells are connected in a normal configuration or alternatively in a balance configuration.

In a further embodiment, when the cells are configured in a balance configuration, the cells are connected to a discharge load, wherein in an embodiment, the discharge load comprises a constant-current, constant-voltage discharge load.

In another embodiment, the discharge load is connected to control circuitry, such that the electrical properties of the discharge load may be modified during the discharge of the battery cells.

In an embodiment of the method in the present disclosure, a balancing circuitry is attached to at least one electrical cell, wherein the balancing circuitry comprises a programmable load and a voltage monitor.

In a further embodiment, the programmable load is operated to draw a current based on the maximum recommended discharge current for at least one cell until the voltage of at least one cell reaches the minimum recommended discharge voltage.

In another embodiment of the method, the method is performed before the cells are assembled into a battery.

In a still further embodiment, the method is performed before the battery is recharged.

DETAILED DESCRIPTION

Figure 1A:
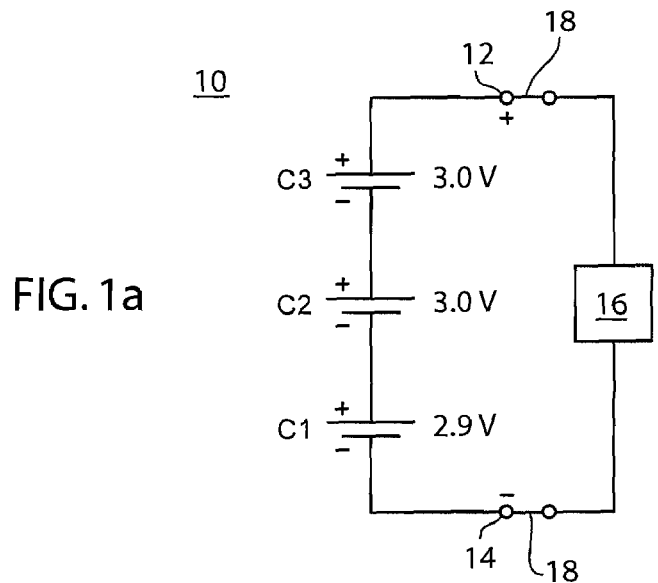
FIGS. 1a-c depict schematic diagrams of the cells of a battery at various states of charge balance and imbalance.
Figure 1B:
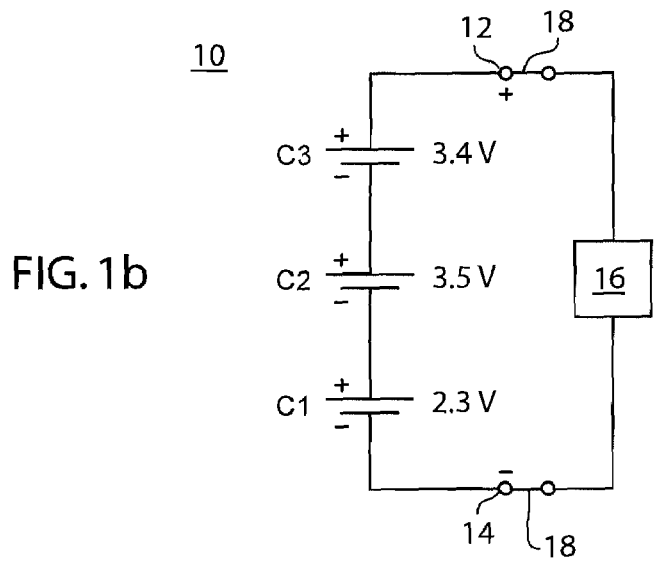
Figure 1C:
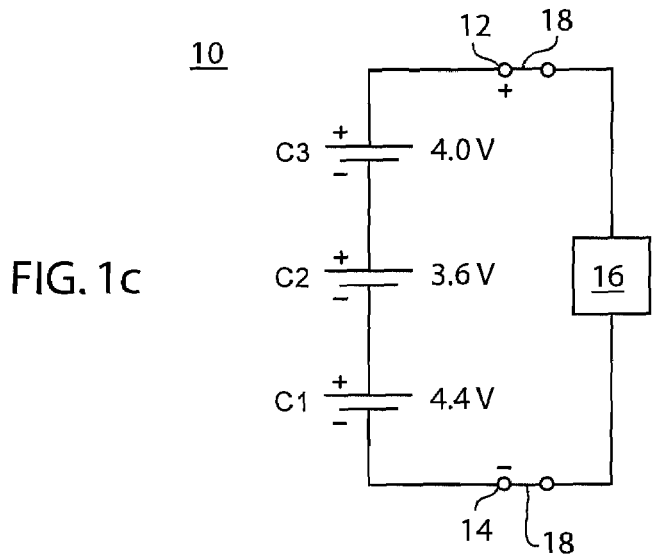

FIGS. 1a-c depict a series of schematic diagrams of a battery 10 comprising electrical cells C1, C2, and C3 connected in series. The battery 10 comprises a positive terminal 12 and a negative terminal 14. The total charge of the battery 10 is the voltage between the positive terminal 12 and the negative terminal 14. An electronic device 16 or other type of electrical load is connected to the battery 10 at the positive terminal 12 and the negative terminal 14 by a load switch 18. The load switch 18 may alternatively be another form of suitable electrical connection between the electronic device 16 and the terminals 12 and 14, respectively, that is not necessarily a switch. When the battery 10 is connected to the electronic device 16, the battery 10 provides the electronic device 16 with a supply of electrical charge. The electronic device 16 uses this charge to operate.

Cells C1, C2, and C3 are connected in series; therefore the individual voltage of each of the cells is summed to determine the total voltage of the battery 10. The charge or voltage of the battery 10 is typically monitored by a fuel gauge (not depicted) consisting of a coulomb counter and a voltage monitor to determine when the battery 10 has become discharged. This determination is made when the voltage of the battery 10 drops below a predetermined battery minimum voltage threshold. Upon the detection of a battery voltage below the minimum voltage threshold, one of the switches 18 is opened such that the battery 10 terminates discharge and no power is supplied to the electronic device 16. Alternatively, the battery 10 may terminate battery discharge upon the detection of any one of the cells C1, C2, or C3 having a charge that is below a predetermined cell voltage threshold. During recharge, the battery 10 is determined to be charged when the total battery voltage between positive terminal 12 and negative terminal 14 reaches a predetermined maximum voltage threshold. Upon reaching this maximum voltage threshold, the battery does not accept additional charge. Similarly, the charging of the battery 10 will be terminated upon the voltage of any single cell C1, C2, or C3 reaching a predetermined cell maximum voltage threshold.

As an exemplary description, hypothetical voltages have been added to each of the cells C1, C2, and C3 in FIG. 1a. In this example, the battery discharge minimum voltage threshold is 9.0 volts and the cell discharge minimum voltage is 2.4 volts. As depicted in FIG. 1a, the voltages of the cells C1, C2, and C3 are relatively balanced and the total battery voltage equals 8.9 volts. Since 8.9 volts is below the battery discharge threshold voltage of 9.0 volts, the battery is determined to be discharged and the battery discharge is terminated and no power is supplied to the electronic device 16. The battery 10 depicted in FIG. 1a has used all or substantially all of the potential charge in each of the cells during the operation of the battery 10. Therefore, the lifespan of the charge on the battery 10 is maximized and the prediction of the operating time remaining for the battery should be relatively accurate due to the even discharge of each of the cells.

FIG. 1b depicts a battery 10 in which the cells C1, C2, and C3 are unbalanced as C1 has 2.3 volts, C2 has 3.5 volts, and C3 has 3.4 volts. In the example of FIG. 1b, the total battery voltage is 9.2 volts, which is above the battery discharge minimum threshold of 9.0 volts; however, the charge of C1 is 2.3 volts which is below the cell discharge minimum voltage threshold of 2.4 volts. Therefore, the battery 10 terminates the supply of the charge to the electronic device 16. This is an inefficient operation as a substantial amount of charge remains in cells C2 and C3 that has not been utilized by the battery 10. Therefore, the life of the battery charge is shorter than it necessarily needs to be and the battery 10 must be recharged more often. Furthermore, the total battery voltage of the battery 10 in FIG. 1b is 9.2 volts which is still above the battery discharge voltage threshold. This can lead to an improper prediction of remaining operating time as the battery voltage is still above the battery discharge voltage threshold, yet the battery has terminated discharge. This inaccurate prediction of the remaining operating time can produce undesired, or potentially dangerous results if the electronic device being powered by the battery 10 cuts off the supply of power prior to the predicted operating time.

Unbalanced cell charge also adversely effects the recharging of a battery 10 as depicted in FIG. 1c. In the example depicted in FIG. 1c the battery charge maximum voltage threshold is 12.3 volts while the cell charge maximum voltage is 4.35 volts. As depicted in FIG. 1c, the battery voltage equals only 12 volts, which is below the battery charge maximum voltage threshold of 12.3 volts. However, because cell C1 has been charged to a level of 4.4 volts, the battery 10 has completed the battery's charge cycle. Therefore the battery 10 has completed charging, yet it as not been completely charged. Therefore, the unbalance of the voltage in C1 as compared to the voltage of cells C2 and C3 limits the recharging of the battery 10 to a charge level that is lower than a full recharge.

This limiting of the battery recharge further reduces the operating time between charge and discharge states of the battery 10, resulting in reduced operational life of the battery 10. It is desirable that the charge in each of the cells is balanced such that no prematurely discharged cell prematurely initiates the termination of the charge supplied by the battery 10, nor that additional remaining charge on any individual cell reduces the total amount of charge added to the battery 10 during recharge.

Figure 2:
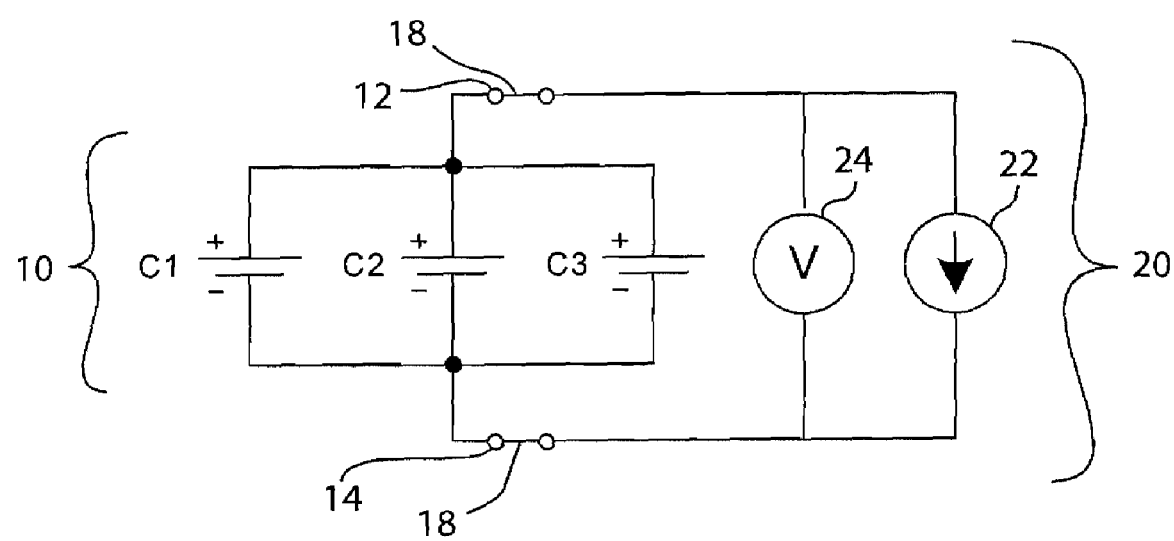
FIG. 2 depicts a schematic diagram of an embodiment of the cell balancing circuitry.

FIG. 2 is a schematic diagram of the battery 10 comprising cells C1, C2, and C3 connected to balancing circuitry 20 by the load switch 18 connected to terminals 12 and 14. The balancing circuitry 20 may comprise a constant-current, constant-voltage (CCCV) load that connects to the cells C1, C2, and C3 in parallel, such that the same voltage from the CCCV load is applied to each of the cells, C1, C2, and C3. The CCCV load may be a programmable load 22. The programmable load 22 may comprise a current sync or a variable resistor; however, it is understood that many other suitable electrical components may be used. The balancing circuitry 20 may further comprise a voltage monitor 24 to monitor the voltage across the programmable load 22. The parallel connection of the cells C1, C2, and C3 to the balancing circuitry 20 forces the balance of cells C1, C2 and C3 in several cell characteristics. These characteristics include the cell voltage, state of charge, and the remaining cell capacity. When the cells C1, C2, and C3 are connected to the balancing circuitry 20, all of the cells are chemically discharged using the programmable load 22 and monitored by the voltage monitor 24 that make up the balancing circuitry 20.

The programmable load 22 may be adjusted or programmed to control the discharge current drawn through the load 22. The current drawn by the programmable load 22 may be based on the cell manufacturer's maximum discharge current for each of the cells in the battery 10. The discharge current is drawn until the cell voltage reaches the cell manufacturer's minimum discharge voltage. The discharge current is then decreased to maintain a constant voltage equal to the cell manufacturer's minimum discharge voltage until the discharge current tapers to a predefined current level. This process provides an inherent balance of the voltage, state of charge, and remaining capacity at the chemical discharge voltage threshold with minimal effects due to internal cell impedance. This process and circuitry also achieves the balance in the shortest amount of time without violating the cell manufacturer's maximum discharge current or minimum discharge voltage recommendations. Once the cells have been balanced during manufacture, the cells can be reconfigured in a series of connections to define the battery.

Figure 3:
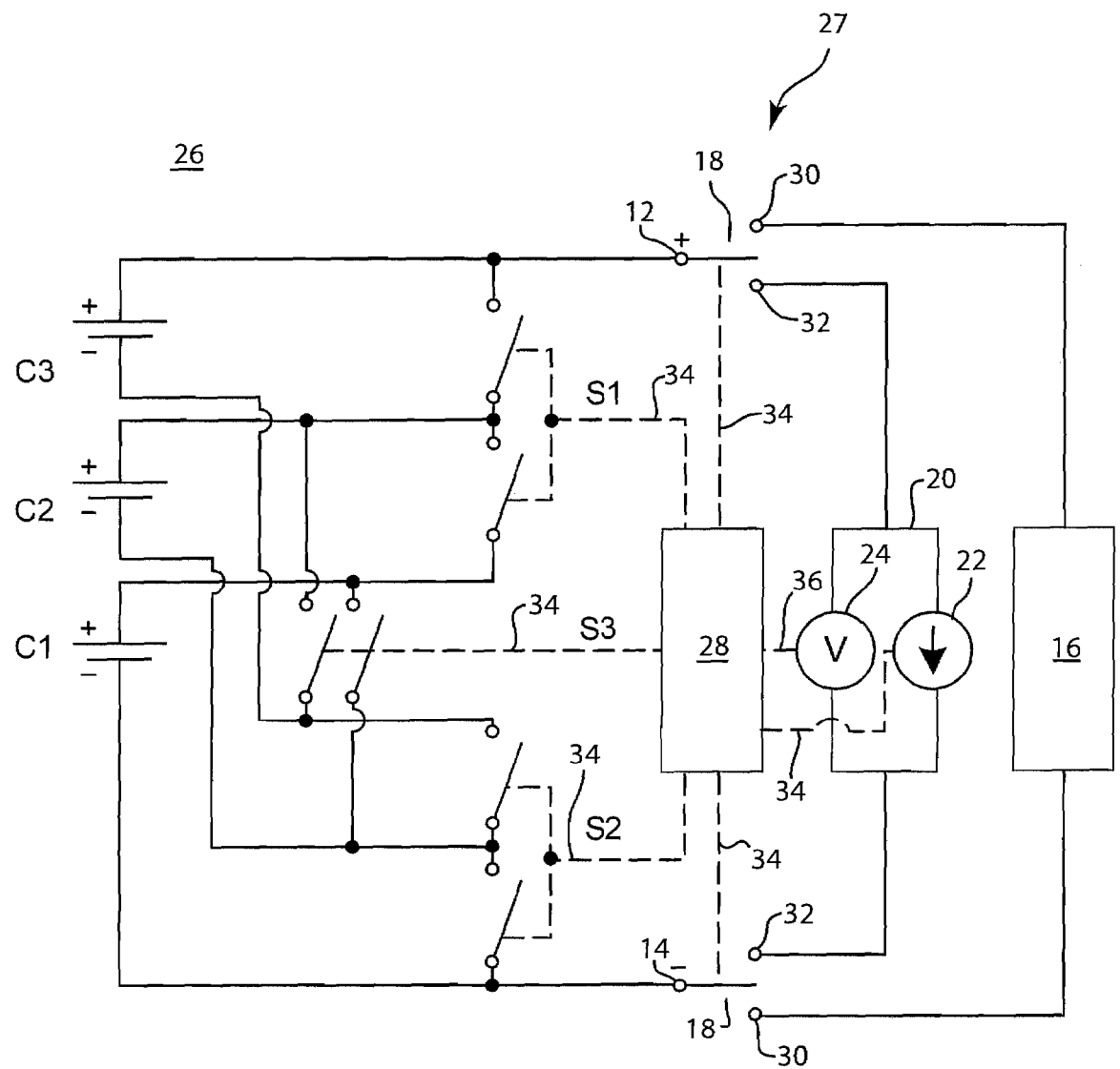
FIG. 3 depicts an embodiment of the cell balancing battery.

FIG. 3 depicts a battery 26 with a battery balancing assembly 27. The battery balancing assembly comprises a plurality of switches, S1, S2, and S3 that are connected to each of the cells C1, C2, and C3. In an embodiment of the battery balancing assembly 27, the switches may comprise MOSFETs; however, many other suitable circuitry components and configurations for the switches may be used. The switches are controlled by a controller 28 to open or close the switches such that the battery balancing assembly 27 is in a desired configuration which may be a normal configuration or a balance configuration. In the normal configuration, the cells C1, C2, and C3 are connected in series between the positive terminal 12 and the negative terminal 14 and the load switches 18 connect the battery to the electronic device 16. In the balance configuration, the cells C1, C2, and C3 are connected in parallel between the positive terminal 12 and the negative terminal 14 and the load switches 18 connect the battery to the balancing circuitry 20.

The positive terminal 12 and the negative terminal 14 are connected to a load switch 18 such that the load switch 18 is able to toggle between a load terminal 30 and a balance terminal 32. The load terminal 30 is connected to an electronic device 16 or other type of load that is to be powered by the battery 26. The balance terminal 32 is connected to the balancing circuitry 20 which comprises the programmable load 22 and the voltage monitor 24. A controller 28 may be connected to the switches, S1, S2, and S3, the load switches 18, the programmable load 22, and the voltage monitor 24. The controller 28 may control these various components by sending a control signal to each of these components via the proper lead 34 that connects the controller 28 to the component. In the embodiment of FIG. 3, the controller 28 comprises a push button (not depicted) that may be manually activated to switch the battery 26 between the operating configuration and the discharge configuration. Alternatively, in a contemplated embodiment of the battery 26, the controller 28 comprises software that controls the switching between the operating configuration and the discharge configuration. This software may use sensed values of the battery voltage obtained by voltage sensors (not depicted) or individual voltages across one or more of the cells in determining the proper configuration for the battery 26.

Figure 4:
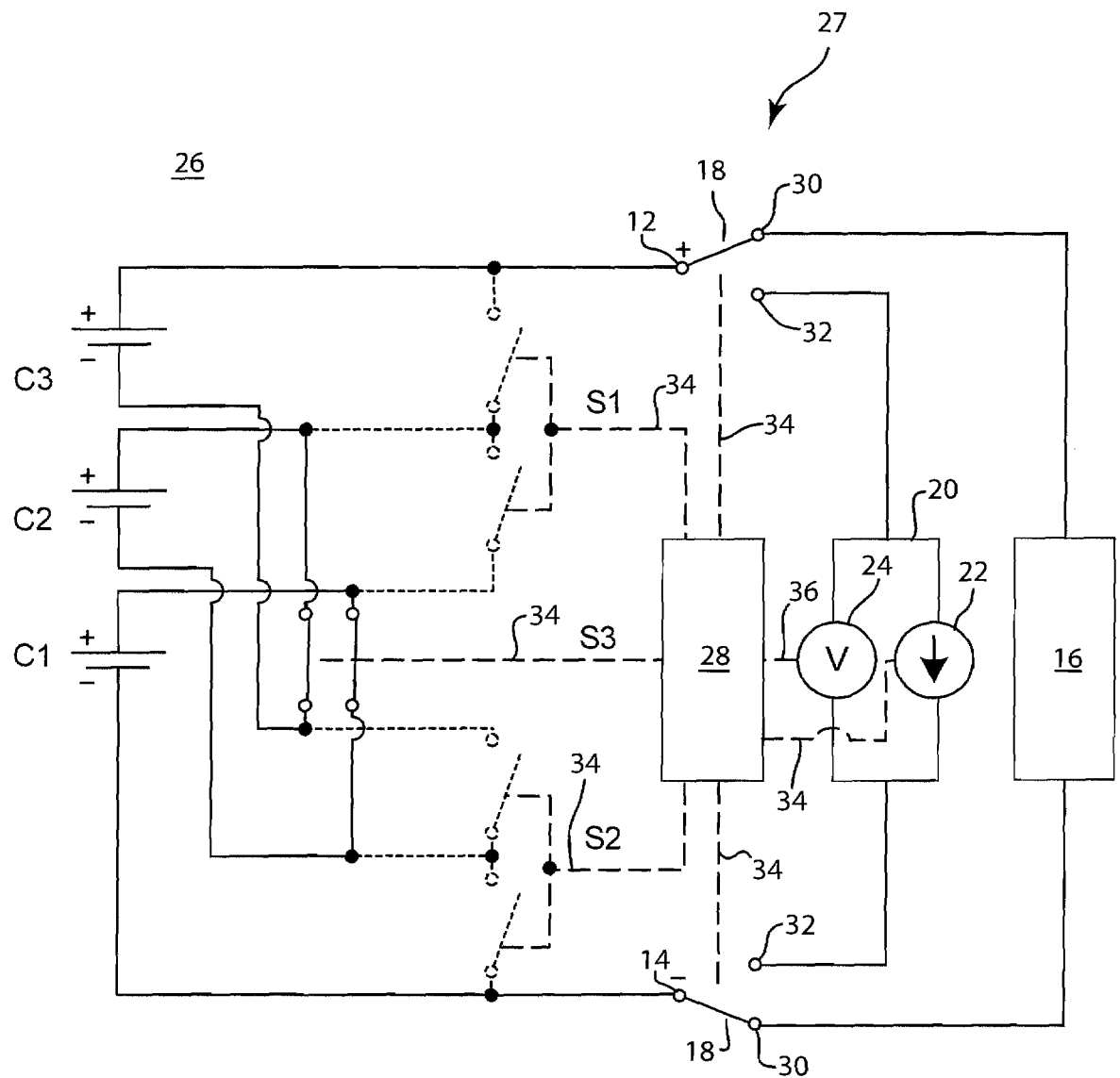
FIG. 4 depicts a schematic diagram of an embodiment of the cell balancing battery in a normal configuration.

FIG. 4 depicts the battery 26 after the controller 28 has sent control signals to operate the battery 26 in the normal configuration. The controller 28 has provided a control signal to switches S1 and S2 such that the switches are in an open state such that no current flows through the switches S1 and S2. Switches S1 and S2 are depicted in FIG. 4 in dashed lines to denote a deactivated state. The controller 28 has sent a control signal to switch S3 such that switch S3 is in a closed state, thereby allowing current to flow through the switch S3. The open state of switches S1 and S2 combined with the closed state of switch S3 connects the cells C1, C2, and C3 in series with positive terminal 12 and negative terminal 14.

The controller 28 controls the load switches 18 to connect the positive terminal 12 and the negative terminal 14 to the load terminals 30. The combined charge from cells C1, C2, C3 is provided in series to the electronic device 16. This operating configuration supplies charge from the battery 26 to the electronic device 16 and may operate as such until a detection circuitry (not depicted) which may comprise voltage sensors as is commonly known in the field of the invention, determines that either the total charge on the battery has fallen below the minimum battery threshold voltage or the voltage of the cells C1, C2, or C3 has fallen below the minimum cell threshold voltage. Upon the crossing of either minimum threshold, the battery will terminate the supply of charge to the electronic device 16. In the embodiment shown, the controller 28 controls the load switch 18 to disengage the load terminals 30.

Figure 5:
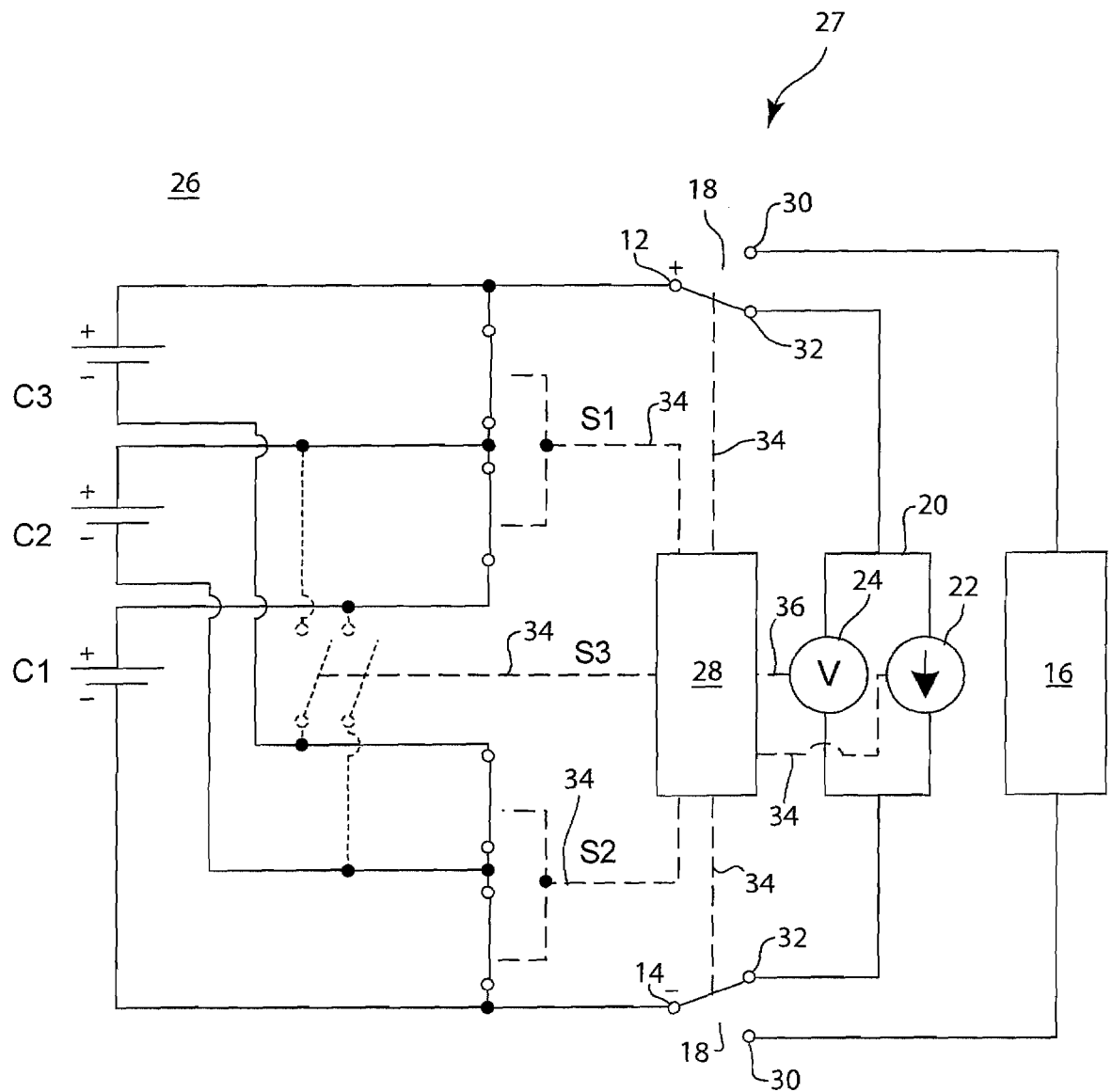
FIG. 5 depicts a schematic diagram of an embodiment of the cell balancing battery in a balancing configuration.

Once the battery 26 has ceased in providing charge to the electronic device 16, but prior to the recharging of the cells C1, C2, and C3 of the battery 26, the controller 28 changes the configuration of the switches, S1, S2, and S3, as well as the load switches 18, to a balance configuration as depicted in FIG. 5. FIG. 5 depicts a schematic diagram of the battery 26 after the controller 28 has sent control signals along leads 34 to switches S1, S2, and S3 such that S1 and S2 are placed in a closed state and switch S3 is changed to an open state. This configuration of switch states places the cells, C1, C2 and C3 of the battery 26 in a balance configuration such that the cells, C1, C2 and C3 are connected in parallel with the positive terminal 12 and the negative terminal 14. The controller 28 further controls the load switches 18 to connect the positive terminal 12 and the negative terminal 14 respectively to the balance terminals 32. The balance terminals 32 are connected to the balancing circuitry 20 which comprises the programmable load 22 and the voltage monitor 24. Therefore, the cells C1, C2, and C3 are connected in parallel to the programmable load 22 and the voltage monitor 24.

Once the cells C1, C2, and C3 are connected in the parallel balance configuration, the programmable load 22 may be operated such as to balance the charge in the cells C1, C2 and C3 to evenly discharge the cells to a complete chemical discharge before these cells are recharged. The programmable load 22 may receive control signals from the controller 28 via lead 34 connected to the programmable load 22. The voltage monitor 24 may send signals indicative of the voltage across the programmable load 22 to the controller 28 vial lead 36. The controller 28 may send control signals to the programmable load 22 based upon the monitored voltage to control the resistance value of the programmable load 22 and the resulting current drawn by the programmable load 22.

The controller 28 may send a control signal to the programmable load 22 such that the resistance of the programmable load 22 changes to draw a constant current out of the battery 26 based on the maximum recommended discharge current for each of the cells C1, C2, and C3. The discharge current may be determined by the controller 28 as being the maximum recommended discharge current for an individual cell multiplied by the total number of cells that are connected in parallel to the balancing circuitry 20. Alternatively, the discharge current drawn by the adjustable load 22 may be the summation of the maximum recommended discharge currents for each of the cells utilized in the battery 26. The discharge current may be drawn until the voltage of at least one of the parallel cells C1, C2, or C3 reaches the minimum recommended discharge voltage for the cell. After this has been detected, the controller 28 may send a control signal to the adjustable load 22 such that the resistance of the adjustable load 22 is gradually increased so as to maintain a constant voltage equal to the cell manufacturer's minimum discharge voltage of an individual cell across the parallel cells. The gradual increase of the resistance counteracts the reducing current drawn from the cells by the programmable load 22, while maintaining a constant voltage. The gradual resistance increase may continue until the current has tapered to a predefined current limit. In an embodiment, the current limit may be 0.05C milliamps where C is the one hour discharge rate; however, this limit is in no way intended to be limiting upon the current threshold to be used with described embodiment; rather, the current threshold may comprise any current value based on the number of cells to be discharged and the manufacturer's characteristics of the cells. Once the current drawn by the adjustable load 22 has been tapered to below the threshold current value, the cells C1, C2, and C3 are determined to be fully discharged and the discharge is terminated. The cell characteristics such as remaining capacity and state-of-charge been balanced at point very close to the manufacturer's recommended discharge voltage. This also produces a cell balance at the critical point of the chemical discharge. The cells C1, C2, and C3 may then be charged to their full de-rated capacity.

De-rating is a process by which a rechargeable battery is charged to a specified voltage below the maximum voltage capacity as recommended by the manufacturer. For example, a battery cell may be charged to 4.2 V as recommended by the manufacturer; however, the de-rated voltage may only 4.1 V. While a de-rated battery experiences some reduced operational life, typically this loss is less than or equal to 10% of the total battery operation life. De-rating the battery improves the number of times a battery can be recharged over the lifetime of the battery and improves the safety considerations of the battery while the battery is being recharged.

In manufacturing an embodiment of the battery, the plurality of cells may be welded together using conductive straps, which may comprise the metal nickel. Prior to the welding of the nickel straps, the cells may be placed into a cell balancing circuitry, such that the cells are placed in parallel with balancing circuitry and the cells are thus balanced prior to assembly of the battery. Alternatively, the cells may be placed in connection individually with balancing circuitry such that the cells are each placed at substantially the same charge state prior to the assembly of the battery. In a further embodiment a controller 28 is not used and human observation and input is used to control the connection of the battery 26 to the balancing circuitry 20 and the control of the programmable load 22.

The medical field utilizes many devices that are desirable in a portable or mobile form. Portable or mobile electronic devices may utilize a battery comprising a plurality of cells as the main power source, or a battery may serve as the back up power source for the operation of these and other electronic devices. Some of these electronic medical devices may be used to monitor the physiological parameters of a patient or may be used to deliver ventilation, nutrition, or other life support. Therefore, a proper power supply is critical to the operation of these medical devices, and the well-being of the patient. Embodiments of the battery as disclosed herein may provide the advantage of enabling a longer battery life between the need for recharging, and may also provide a more accurate estimation of remaining battery charge. Hazardous results may arise if a battery utilizes unbalanced cells and therefore the battery may indicate that charge remains in the battery, while the battery terminates the supply of charge because one of the cells has fallen below the cell discharge minimum voltage threshold. Furthermore, safety standards for medical devices that may utilize a battery as a power source, require that a warning be displayed upon the determination that five minutes of battery charge is remaining in the power source. If the battery terminates the supply of charge prior to the estimated shut down time, this safety standard may not be met. Therefore, by balancing the cells after the discharge of the battery, this safety standard is more reliably achieved and failures to provide an adequate five minute warning may be reduced.

Embodiments of the presently disclosed battery may comprise the use of lithium ion (Li-Ion) cells in the battery.

Further embodiments of the described battery may comprise any number of cells and required switches to control the cell configuration as may be necessary for the specific battery design. While all of the present descriptions have utilized a battery comprising three cells and three switches, it is well understood that any number of battery cells may be used in combination within the present disclosure. Furthermore, it is understood and contemplated that as the number of series cells increases, the number of switches would necessarily increase.

Embodiments of the battery exhibit the advantage of improved battery life and/or charge capacity over other rechargeable batteries as the cell balancing may be performed at either an initial discharge prior to the assembly of the battery, or after every discharge of the battery, before the battery is recharged.

Embodiments of the battery further provide the advantage of providing an exact balance at a critical point in the battery voltage discharge. The battery discharge voltage discharges at an exponential rate, therefore exacerbating any unbalance in any of the cells as the cells approach the discharge minimum voltage threshold. The balancing circuitry achieves a cell charge balance at the cell manufacturer's discharge voltage. This allows the cells to evenly discharge in the next operation cycle to evenly discharge through the critical point of the cell chemical discharge.

Embodiments of the battery further provide the advantage of a more reliable cell discharge such that fewer inadvertent power shut downs are experienced due to cell unbalance, the battery is able to provide a more accurate prediction of remaining battery charge, and the prediction of the remaining battery charge is more accurate at low levels of battery charge, when the prediction is the most important.

This written description uses examples to disclose features of the embodiments, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various alternatives and embodiments are contemplated as being with in the scope of the following claims, particularly pointing out and distinctly claiming the subject matter regarded as the invention.

What is claimed is:

1. A method of evenly discharging a plurality of electrical cells configured to provide electrical power as a battery, the method comprising:
   connecting the plurality of electrical cells to a balancing circuit, the balancing circuit comprising a programmable load, the programmable load drawing a current;
   operating the programmable load to draw a constant current;
   monitoring the voltage across each of the plurality of electrical cells;
   upon the monitored voltage across one of the electrical cells falling below a predetermined threshold, operating the programmable load to draw a minimum recommended discharge voltage from the plurality of electrical cells;
   increasing the resistance of the programmable load with respect to a change in the current to maintain the minimum recommended discharge voltage across each cell;
   monitoring the current drawn from the plurality of electrical cells; and
   discharging the cells until the current drawn from cells is tapered below a predetermined threshold current.

2. The method of claim 1 wherein discharging the cells forces a balance in the voltage, state of charge, and remaining capacity at the point of chemical discharge for the cells.

3. The method of claim 1, further comprising:
   monitoring the level of charge in each of the plurality of electrical cells; and
   upon sensing that the charge of one of the plurality of electrical cells is below a predetermined threshold, discharging the plurality of electrical cells.

4. A rechargeable battery for providing charge to an electronic device, comprising:
   a first cell storing an electric charge in an amount between a charged capacity and a depleted capacity;
   a second cell connected in parallel to the first cell, the second cell storing an electric charge in an amount between a charged capacity and a depleted capacity;
   a variable resistance discharge load connected in parallel to the first cell and the second cell, the variable resistance discharge load drawing a constant current from the first and second cells until the first cell reaches a predetermined minimum cell voltage, upon when the resistance of the discharge load varies to constantly draw the predetermined minimum cell voltage from the cells until the current drawn from the cells reaches a predetermined minimum current.

5. The rechargeable battery of claim 4 further comprising a plurality of switches connected between the first cell, second cell, discharge load and the electronic device, wherein the switches are operated in a first configuration to provide charge from the first cell and the second cell to the electronic device and to disconnect the first cell and the second cell from the discharge load and the plurality of switches are operated in a second configuration to connect the first cell and the second cell to the discharge load, while disconnecting the first cell and the second cell from the electronic device.

6. The rechargeable battery of claim 5, further comprising:
   a first voltage monitor monitoring the voltage across the first cell; and
   a second voltage monitor monitoring the voltage across the second cell.

7. The rechargeable battery of claim 6, further comprising a controller connected to the first voltage monitor, the second voltage monitor, and the plurality of switches, the controller operating the switches in the first configuration to provide electrical charge to the electronic device, and wherein when a voltage from the first or second voltage monitor falls below a predetermined threshold, the controller operates the switches in the second configuration to connect the first and second cells to the discharge load.

8. The rechargeable battery of claim 7 wherein when the controller is operating the plurality of switches in the first configuration the controller further monitors the total voltage of the first cell and the second cell, the controller operating the plurality of switches in the second configuration if the total voltage falls below a predetermined minimum total voltage threshold.

9. The rechargeable battery of claim 5 further comprising a controller that controls the plurality of switches between the first configuration and the second configuration.

10. The rechargeable battery of claim 4, wherein the variable resistance discharge load is a constant-current, constant-voltage discharge load.

11. The rechargeable battery of claim 4, wherein the first cell and the second cell are lithium ion cells.

12. The rechargeable battery of claim 4, wherein the electronic device is a medical device.

13. An assembly for regulating the discharge of a plurality of cells within a battery, the plurality of cells having unbalanced cell charges, the assembly comprising:
   a balancing circuit, comprising a programmable discharge load and selectively connected to the battery, the balancing circuit, when connected to the battery, balances the charges in the plurality of cells by first operating the programmable discharge load to draw a constant current out of the battery and then operating the programmable discharge load to draw a constant voltage from the battery until the plurality of cells are evenly discharged; and
   a plurality of switches between the plurality of cells and the balancing circuit, each of the switches being positionable in a closed state whereby electrical current is allowed to pass and an open state whereby no electrical current is allowed to pass, the plurality of switches having a normal configuration wherein the plurality of switches connect the plurality of cells in series and a balance configuration wherein the plurality of switches connect the plurality of cells in parallel to the balancing circuitry.

14. The assembly of claim 13, further comprising a controller connected to the plurality of switches, the controller operating the switches in the normal configuration to provide electrical charge to an electronic device connected to the plurality of switches, and wherein when a voltage across one of the plurality of cells falls below a predetermined threshold, the controller operates the switches in the balance configuration to connect the plurality of cells to the discharge load.

15. The assembly of claim 14, wherein when the controller is operating the plurality of switches in the first configuration the controller further monitors the total voltage of the battery, the controller operating the plurality of switches in the second configuration if the total voltage of the battery falls below a predetermined threshold.

16. The assembly of claim 13, wherein the controller is further connected to the balancing circuit and when the controller operates the switches in the balance configuration, the controller operates the balancing circuit to first draw a constant current out of the battery while monitoring the voltage across each of the plurality of cells, and when one of the monitored cell voltages falls below a predetermined threshold, the controller operates the balancing circuit to draw a constant voltage at the predetermined voltage from the battery, until the plurality of cells are evenly discharged.

17. The method of claim 1, further comprising recharging the plurality of electrical cells after the cells are discharged.

18. The method of claim 1, further comprising connecting the plurality of electrical cells in parallel to each other and to the balancing circuit.

19. The method of claim 18, wherein the plurality of electrical cells of the battery are connected in series during operative use of the battery and before discharging, the connections between the electrical cells must be switched from series to parallel connections.

20. The method of claim 3, further comprising:

monitoring the level of charge across the battery; and upon sensing that the charge across the battery is below a predetermined minimum battery charge, discharging the plurality of electrical cells.

* * * * *